UNITED STATES PATENT OFFICE.

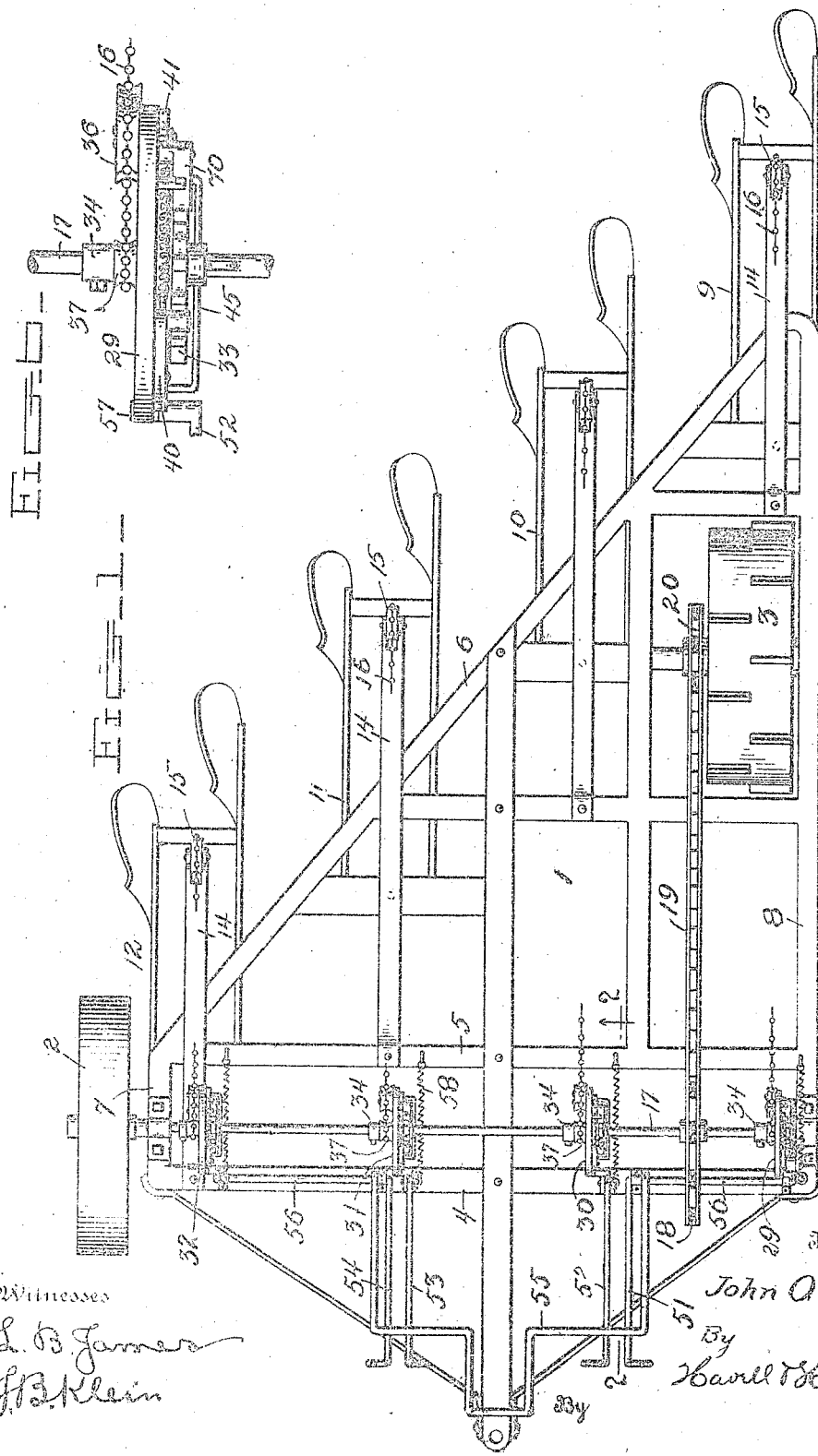

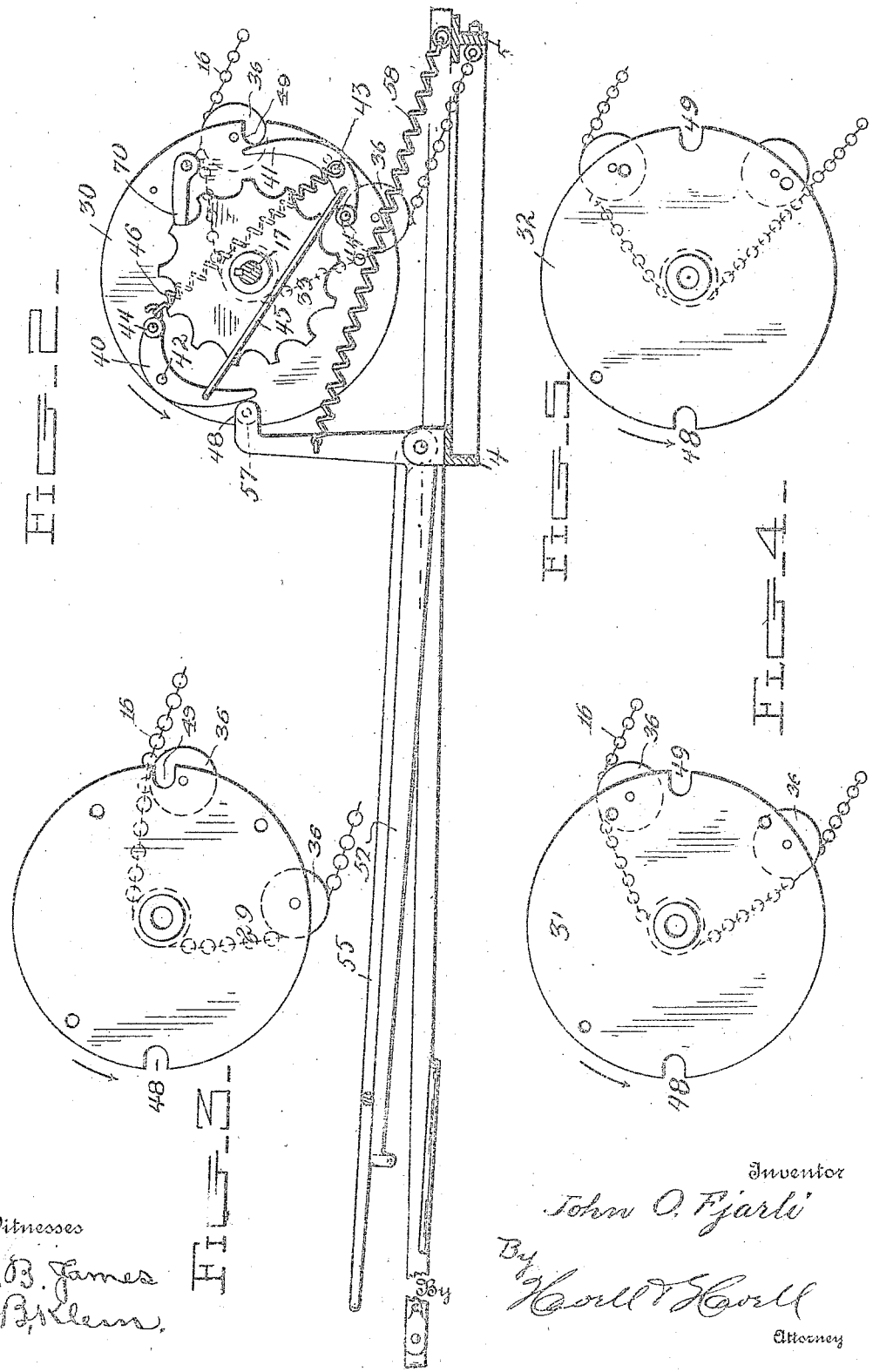

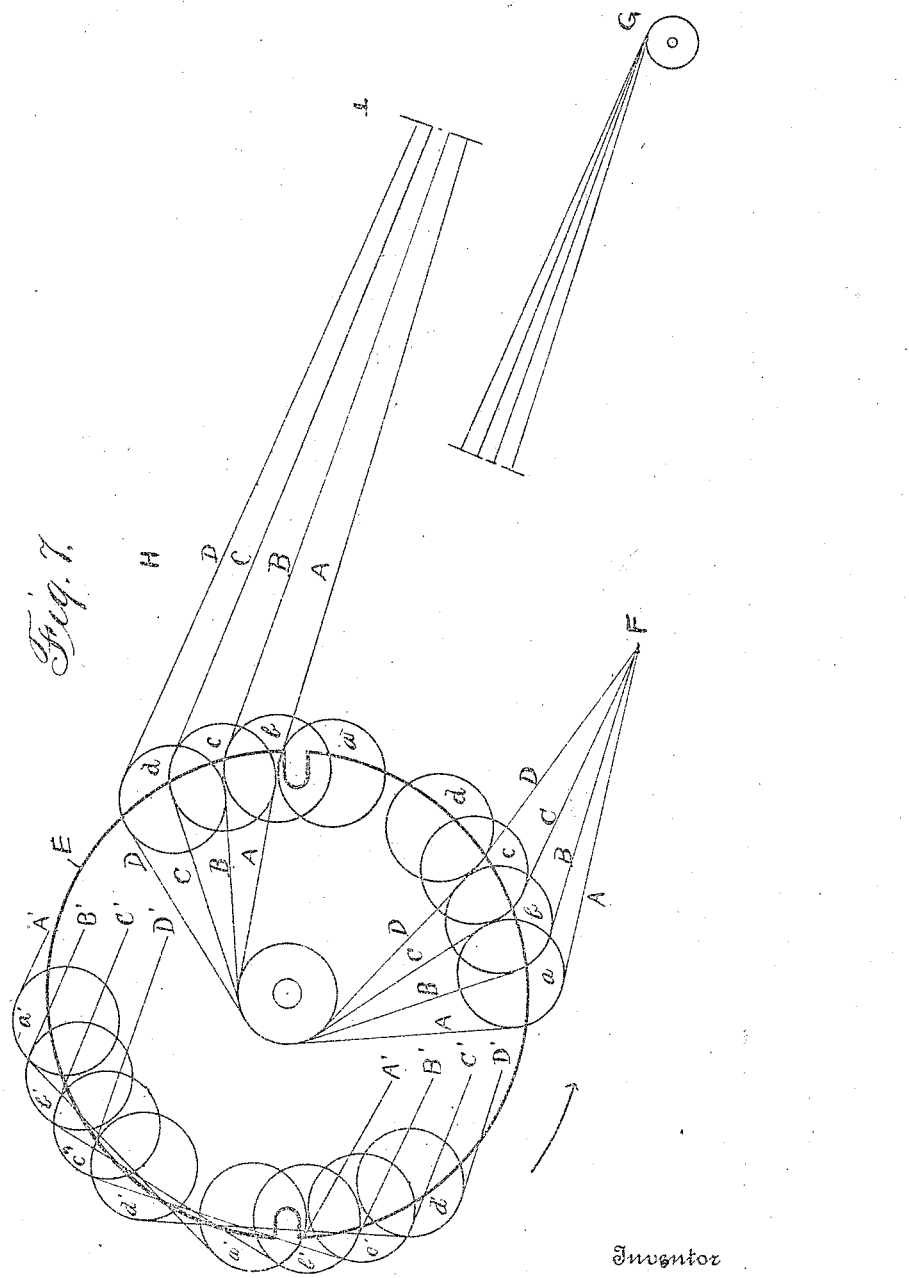

JOHN O. FJARLI, OF BERWICK, NORTH DAKOTA.

GANG-PLOW.

1,124,004.  Specification of Letters Patent.  Patented Jan. 5, 1915.

Application filed December 20, 1909, Serial No. 534,227. Renewed May 21, 1914. Serial No. 840,125.

*To all whom it may concern:*

Be it known that I, JOHN O. FJARLI, a citizen of the United States, residing at Berwick, in the county of McHenry and State of North Dakota, have invented new and useful Improvements in Gang-Plows, of which the following is a specification.

This invention relates to certain new and useful improvements in gang plows, such as are drawn by traction or other power vehicles, or are operated by self contained power.

The object of the invention is to provide means for raising the plows out of the soil and for lowering the same into the soil at will through means operated from the traction wheel of the vehicle, or any other rotary element thereon.

The above and other characteristic features of the invention are fully illustrated in the accompanying drawings forming a part of this specification and wherein like characters of reference designate corresponding parts throughout the several views, in which:

Figure 1 is a top plan view. Fig. 2 is a vertical sectional view taken on line 2—2 of Fig. 1. Figs. 3, 4 and 5 are views in side elevation of the locking disks detached illustrating the different relative location of the wheels thereon for the plow frame raising and lowering chains. Fig. 6 is a top plan view of one of the locking disks with its complement ratchet wheel, and Fig. 7 is a diagram in two parts illustrating the theory of operation of the plow raising devices.

Reference numeral 1 designates the vehicle frame. 2 one of the traction wheels therefor, and 3 the other traction wheel from which the plow raising and lowering mechanism is operated. The vehicle frame essentially comprises parallel front and intermediate bars 4 and 5 and diagonal rear bar 6, and side bars 7 and 8.

The plows are mounted in duplicate on plow frames 9, 10, 11 and 12, said frames being suitably connected with the vehicle frame for raising and lowering. The plows and frames therefor are arranged in diagonal series parallel with the said rear bar 6 of the vehicle frame. There are provided suitable devices for lifting the plows from the ground. As shown, there is secured to the vehicle frame and projecting rearwardly therefrom and above each of said plow frames a beam 14 provided in its rear end with a pulley 15. Attached to the plow frames are chains 16, the chain of each plow-frame leading upwardly over the pulley 15 of its respective beam 14. It will be understood that as concerns the exact form of the lifting devices immediately associated with the plows there can be considerable variation within the scope of the invention. The chains 16 extend forwardly over and around the main shaft 17 and then rearwardly and downwardly to the intermediate vehicle frame bar 5 to which the free ends of said chains are attached. The said main shaft 17 has its free ends journaled in the vehicle side bars 7 and 8 and extends across the vehicle frame between and parallel with the said bars 4 and 5. Keyed to said main shaft 17 is a sprocket wheel 18 operably connected by means of a sprocket chain 19 with a sprocket wheel 20, which latter is operated by said traction wheel 3. While the main shaft is illustrated as being operated from the vehicle traction wheel, it may be operated by an independent motor or engine carried on the vehicle frame or from any other rotatable element to be found in plows of this type.

Loose upon the main shaft are locking disks 29, 30, 31 and 32, the disk 29 being arranged or located at a point on the shaft in line with the beam 14 of the plow frame 9, and the remaining locking disks 30, 31 and 32 are similarly located relatively to their plow frames 10, 11 and 12. Keyed to the main shaft 17 are ratchet wheels 33, one being provided for each locking disk, on one side thereof, and each locking disk is held between its ratchet wheel 33 and a collar 34, the latter also fixed to the main shaft 17.

Upon one side of each locking disk are journaled two lifting pulleys 36, which, upon rotation of the locking disks, as indicated by the arrows in Figs. 2, 3, 4 and 5, engage the plow-frame raising and lowering chains 16, thereby raising the plow frames on one half revolution of the locking disks and lowering them upon the other half revolution of said disks. While the plow frames are in their lowered positions, the locking disks, pulleys 36, and chains 16 will be in the positions illustrated in Figs. 2, 3, 4 and 5, in which views the chains 16 are shown apparently in contact with the shaft, but by referring to Fig. 6, it will be noted that the locking disks are each equipped with a hub portion 37 around which the said chains 16 pass to prevent abrasion of the main shaft 17 and displacement of the chains.

The mechanism for rotating the locking disks comprises two pawls 40 and 41, a pair being pivotally mounted by pins 42 and 43, upon each of said locking disks. One end of each pawl, as illustrated in Fig. 2, is provided with a collar 44 adapted to enter one of the notches in the ratchet wheels 33. The roller end of one pawl of each disk is connected by means of a rod or link 45 with the opposite end of the other pawl of the pair so that the roller ends of both associated pawls will act upon the ratchet wheel 33 in the same manner. The roller end of the pawls are normally drawn into engagement with the ratchet wheel by means of a spring 46 attached to the roller end of pawl 40 and to the pivot pin 43 of the complement pawl 41. The locking disks are provided with peripheral notches 48 and 49 at diametrically opposite points, and the tail ends of the pawls 40 and 41 are so related to said notches 48 and 49 respectively that when the roller ends of the pawls are engaged with the ratchet wheel 33, said tail ends will move outwardly to overlap said notches as will be apparent.

Pivotally mounted upon the forward end of the vehicle frame are foot levers 51, 52, 53, 54 operable independently. These levers may be operated simultaneously by means of a main foot lever 55 pivoted upon the shaft portions 56 of the foot levers 51 and 54 and engaging all of said foot levers. Each of the foot levers 51, 52, 53, 54 is in the form of a bell-crank, the foot depressing portion being substantially in a horizontal plane and the locking portion extending upwardly to a point in horizontal alinement with the axis of the main shaft 17 where it is bent at right angles and provided with a roller 57, adapted to enter one or the other of the locking-disk notches 48—49, due to the releasing of pressure by the foot and the action of the spring 58 attached to each foot lever and to the bar 5 of the vehicle frame. Owing to the diagonal arrangement of the plow frames, the pulleys 36 are arranged at different relative points on the locking disks, as illustrated in Figs. 2, 3, 4, 5, and diagrammatically in Fig. 7 in order that the plows will enter and leave the soil at different times successively so that the furrows will begin and end at the same points.

The operation is as follows: Upon the plow vehicle being drawn or propelled over the soil, a continuous rotary motion is imparted by sprocket chain 19 to the main shaft 17, and to the ratchet wheels 33 keyed thereto. The locking disks 29, 30, 31 and 32 being loose upon the main shaft 17 are held against rotation by means of the roller ends of the foot levers 51, 52, 53 and 54 engaging in one or the other of the locking disk notches, due to the action of springs 58 normally drawing said roller ends 57 of foot levers toward said disks. In Figs. 2, 3, 4 and 5 the locking disks are illustrated in the positions assumed when the plows are lowered, and by referring to Fig. 2 it will be seen that the roller ends 57 of the foot levers are engaged in the notches 48 of the locking disks. The tail end of the pawl 40 is pressed inwardly by the roller end of the foot lever thereby holding the roller end 44 of the pawl 40 out of engagement with the ratchet wheel 33 against the action of the spring 46. Pawl 41 it will be understood, acts the same as pawl 40 due to the connecting link 45. In these positions, the various elements remain during the plowing operation. When it is desired to discontinue the plowing, the operator depresses the foot levers by pressure upon the master lever 55 thereby withdrawing the roller ends 57 from the notches 48 and permitting the spring 46 to draw the roller ends 44 of the pawls 40—41 into locking engagement with the ratchet wheels 33 thereby causing the disks 29, 30, 31 and 32 to rotate with the main shaft 17 in the direction indicated by the arrows. During the half rotation of the locking disks, the pulleys 36 thereof will successively engage the chains 16, drawing upon the same to successively raise the plows from engagement with the soil. Pressure is released upon the foot levers as soon as the disks begin to rotate and the rollers 57 of said foot levers remain in rolling contact with the periphery of the said locking disks until notches 49 present themselves, at which time springs 58 will cause said roller ends 57 to fall into said notches 49, depressing the tail ends of the pawl 41 and raising the roller ends 44 thereof from engagement with the ratchet wheels 33; pawl 40 being similarly affected due to link 45. Thus the locking disks will once more be held stationary until it is again desired to lower the plows into the soil. During the lowering operation the weight of the plows will cause the locking disks to run away from the ratchet wheel and turn too fast, and to prevent this a pawl 70 is provided on each of the locking disks for engagement with the adjacent ratchet wheel.

The theory of operation of the plow raising devices is more clearly illustrated in diagram in Fig. 7. When the plows are to be raised, the disks 29, 30, 31 and 32, which are indicated by letter E, are rotated in the direction of the arrow, thereby moving their respective pairs of pulleys 36 from the positions $a, a; b, b; c, c; d, d;$ and the chains 16 from positions $a', a'; b', b'; c', c'; d', d';$ and the chains 16 from positions A, B, C, D, to the positions A', B', C', D'. When the parts are in the positions indicated by the reference letters bearing exponents, the plows are in their raised positions. Letter F indicates the points where the chain 16 is attached to the vehicle frame, and letter G the pulleys 15 over which the chains pass to the plows. In the diagram the measured pull on the chains is substantially equal to the distance between points H and I in the diagram.

While I have herein shown and described the operation of devices adapted for the lifting of a plurality of plowing units, preferably either in timed successive relationship or independently under manual control, it will be understood that the invention as herein set forth is limited to a single plowing unit and the devices for raising and lowering it.

I do not herein claim the series of plowing units and the series of lifting devices so constructed and related as to automatically lift the plows in uniformly timed succession; and I do not herein claim the devices which make it possible for the operator to set all of the lifting devices into operation simultaneously or to set one or more of them into operation independently of the others. These features above disclaimed are presented in my copending application, Serial No. 876,671, filed December 11, 1914, as a division of this application.

Having fully described the invention, what is claimed as new and useful and desired to be secured by Letters Patent is:—

1. In combination with a vehicle frame and a plow carried thereby, a continuously rotating power driven shaft on said frame, means journaled on said shaft for raising the plow on one half revolution of the shaft and for lowering the plow on the other half revolution and means for coupling said shaft and first means.

2. In combination with a vehicle frame and a plow carried thereby, a continuously rotating power driven shaft on the said frame, means journaled on the said shaft for raising the plow on one half revolution of the shaft and for lowering the plow on the other half revolution of the shaft, and means for locking the first means against movement on every half revolution thereof.

3. In combination with a vehicle frame and a plow carried thereby, a continuously rotating power driven shaft on said frame, plow raising and lowering means journaled on said shaft, means for operably coupling said means with said shaft, and means adapted to operate said second means and to lock said first means against movement on every half revolution of the latter.

4. In combination with a vehicle frame and a plow carried thereby, a continuously rotating power driven shaft on said frame, a ratchet means rigid with said shaft, plow raising and lowering means journaled on said shaft, means for coupling said last means with the ratchet means, and means adapted to operate said coupling means and to lock said raising and lowering means against movement on every half revolution of the latter.

5. In combination with a vehicle frame and a plow carried thereby, a continuously rotating power driven shaft on said frame, plow raising and lowering means journaled on said shaft, means for operably coupling said means with said shaft, and means adapted to simultaneously operate said coupling means and to lock said plow raising and lowering means against rotation on every half revolution of the latter.

6. In combination with a vehicle frame and a plow carried thereby, a power driven shaft on said frame, a plow raising and lowering wheel journaled on the shaft and having diametrically opposite stop notches, ratchet means fixed to the shaft, means on said wheel for coupling the same to the ratchet means for movement with the shaft, and means adapted to enter said notches to lock said wheel on every half revolution thereof, and to operate said coupling means.

7. In combination with a vehicle frame and a plow carried thereby, a power driven shaft on said frame, a plow raising and lowering wheel journaled on the shaft, and having diametrically opposite stop notches, ratchet means fixed to the shaft means on the wheel for operably coupling and uncoupling the same with the ratchet means, said coupling means when in coupled position overlapping said stop notches, and means adapted on every half revolution of the wheel to enter one of said notches and engage and uncouple said coupling member and simultaneously therewith to lock said wheel against movement.

8. In combination with a vehicle frame and a plow carried thereby, a power driven shaft on said frame ratchet means fixed to the shaft, a plow raising and lowering member having diametrically opposite notches, pawls on the said member for coupling said member and ratchet means, and means adapted to enter one of said notches and engage and operate one of said pawls on every half revolution of said member.

9. In combination with a vehicle frame and a plow carried thereby, a power driven shaft on said frame, means journaled on said shaft for raising the plows on one half revolution of the shaft and for lowering them on the other half revolution, said means being provided with diametrically opposite stops, means adapted to come into engagement with said stops to lock the said first means against movement with the shaft on every half revolution, and means for coupling said first means and shaft, said last means being operable by said second means upon engagement of the latter with either of the said stops.

10. In combination with a vehicle frame and a plow carried thereby, a power driven shaft on said frame, ratchet means fixed with the shaft, a member journaled on the shaft, said member being provided with diametrically opposite stops, coupled pawls on said member for coupling the same for movement with the ratchet means, and means adapted to come into engagement with said stops to lock said member against rotation on every half revolution of the latter, said pawls being operable by said last means while engaging either stop.

11. In combination with a vehicle frame and a plow carried thereby, a power driven shaft on said frame, ratchet means fixed to the shaft, a diametrically notched disk for raising and lowering the plow on alternate half revolutions, said disk being journaled on said shaft, pawls diametrically oppositely mounted on the disk adjacent the notches and adapted to overlap the same, said pawls being adapted to couple said disk and ratchet means for simultaneous movement, and means adapted to enter one of said notches on every half revolution of the disk to lock the latter and to operate the pawls.

In testimony whereof I have hereunto set my hand in presence of two subscribing witnesses.

JOHN O. FJARLI.

Witnesses:
ALFRED WIGEN,
OLE NYHUS.